United States Patent [19]

Fujioka

[11] Patent Number: 4,894,861

[45] Date of Patent: Jan. 16, 1990

[54] TERMINAL IN COMMUNICATION NETWORK FOR NOTIFYING ORIGINATING PARTY'S NUMBER

[75] Inventor: Masanobu Fujioka, Ohmiya, Japan

[73] Assignee: Kokusai Denshin Denwa Kabushiki Kaisha, Tokyo, Japan

[21] Appl. No.: 273,213

[22] Filed: Nov. 18, 1988

[30] Foreign Application Priority Data

Dec. 10, 1987 [JP] Japan .................................. 62-310839

[51] Int. Cl.⁴ ......................... H04M 1/57; H04M 3/42
[52] U.S. Cl. ..................................... 379/374; 379/376; 379/217; 379/67
[58] Field of Search ................ 379/373, 374, 376, 217

[56] References Cited

U.S. PATENT DOCUMENTS 4,720,848 1/1988 Akiyama .............................. 379/374

Primary Examiner—Stafford D. Schreyer
Attorney, Agent, or Firm—Emmanuel J. Lobato; Robert E. Burns

[57] ABSTRACT

A terminal in communication network for notifying an originating party's number is disclosed which transfers the subscriber's number of an originating party to a terminating party at the time of setting up an incoming call. A plurality of subscriber's numbers of those from whom incoming calls are anticipated and ID information corresponding to each of the subscriber's number are pre-registered. An output command indicating that one of the registered subscriber's number has coincided with the subscriber's number of an originating party transferred at the time of occurrence of the incoming call is generated. In response to the output command, an audible indication of the ID information corresponding to the registered subscriber's number is provided.

3 Claims, 3 Drawing Sheets 4,894,861

TERMINAL IN COMMUNICATION NETWORK FOR NOTIFYING ORIGINATING PARTY'S NUMBER

BACKGROUND OF THE INVENTION

The present invention relates to a communication network which provides an originating number notifying service (and which will hereinafter be referred to as an "originating number notifying communication network") and, more particularly, to a terminal suitable for use in the originating number notifying communication network.

Some telephone networks and ISDNs (Integrated Services Digital Networks) offer an originating number notifying service which indicates the originating party's telephone number of ISDN number (which will hereinafter be referred to as a "subscriber's number") to the terminating party at the time of setting up a call.

Since such a telephone terminal only displays the originating party's number on the display, however, it is necessary for the terminating subscriber to see the display and judge the originating party from the displayed telephone number.

Accordingly, when the terminating subscriber is away from the telephone terminal, he cannot judge the originating subscriber, and even if a third party sees the telephone number on the display, he cannot judge the originating subscriber either.

SUMMARY OF THE INVENTION

It is an object of the present invention to provide a terminal, to be used for an originating number notifying communication network, which is intended to solve the abovementioned defect of the prior art and which enables the terminating subscriber of a cell from a registered originating party to judge the originating party from an audible indication immediately upon receiving the incoming call set-up indication.

The feature of the present invention resides in that the originating number notifying communication network, which transfers the subscriber's number of the originating party to the terminating party at the time of setting up a call, is provided with:

memory means for pre-registering a plurality of subscriber's numbers of those from whom incoming calls are anticipated and ID information corresponding to each of the subscriber's numbers;

control means for generating an output command indicating that one of the registered subscriber's numbers has coincided with the subscriber's number of an originating party transferred at the time of occurrence of the incoming call; and speech generating means for responding to the output command of the control means to provide an audible indication of the ID information corresponding to the registered subscriber's number.

BRIEF DESCRIPTION OF THE DRAWINGS

The present invention will be described in detail below in comparison with prior art with reference to the accompanying drawings, in which.

DETAILED DESCRIPTION

To make difference between prior art and the present invention clear, an example of prior art will first be described.

Figure 1:
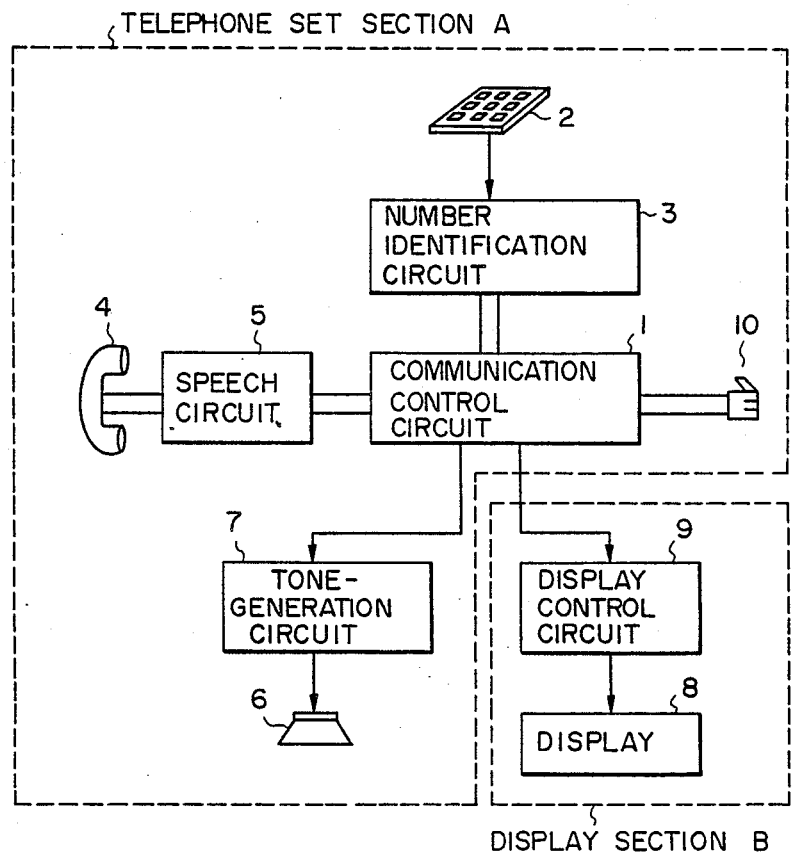
FIG. 1 is a diagram illustrating the arrangement of a conventional telephone terminal for an analog telephone network.

FIG. 1 shows an example of the arrangement of a telephone terminal for a conventional analog telephone network or a private branch exchange (PBX) which provides the originating number notifying communication service. In FIG. 1 reference numeral 1 indicates a communication control circuit which controls the transmission and reception of signals on a paired cable subscriber's line interconnecting a local exchange in the telephone network and a user's home, the transmission and reception of voice signals and tones from/at a handset to/from subscriber's line, the transfer of the dialled number to the local switch, the generation of tones (e.g.: a ringing tone) and display on a display device. Reference numeral 2 designates a number input circuit provided with push buttons or a dial, 3 a number identification circuit which transmits a push-button or dialled numbers by the user to the communication control circuit 1, 4 a handset, 5 a speech circuit which performs an conversion operation between an electrical signal used in the handset 4 and an electrical signal on the subscriber's line, 6 a speaker for generating tones, 7 a tone-generation circuit which causes the speaker 6 to generate the tone, 8 a display for displaying numbers such as a dial number, 9 a display control circuit which controls the display 8, and 10 a modular jack to be put into a socket which is provided on a wall or pillar to connect this telephone terminal to a telephone network. This telephone terminal comprises a telephone set section A which includes the communication control circuit 1 through the tone-generation circuit 7 and the modular jack 10 of the conventional telephone terminal and a display section B which includes the display control circuit 9 and the display 8.

Next, a description will be given of how the telephone terminal of the arrangement shown in FIG. 1 is used for the originating number notifying communication network. In this instance, the originating party's number (the subscriber's number) which is transferred from the originating number notifying communication network is received by the communication control circuit 1, from which it is provided to the display control circuit 9. The display control circuit 9 then displays the originating party's number on the display 8.

Since such a telephone terminal as described above only displays the originating party's number on the display 8, however, it is necessary for the termination subscriber to see the display and judge the originating party from the displayed telephone number.

Accordingly, when the terminating subscriber is away from the telephone terminal, he cannot judge the originating subscriber, and even if a third party sees the telephone number on the display 8, he cannot judge the originating subscriber either.

With reference to the accompanying drawings the present invention will hereinafter be described in detail.

In the following description the same parts as those in the prior art example are identified by the same reference numerals and will not be described for the sake of brevity. (Embodiment 1)

Figure 2:
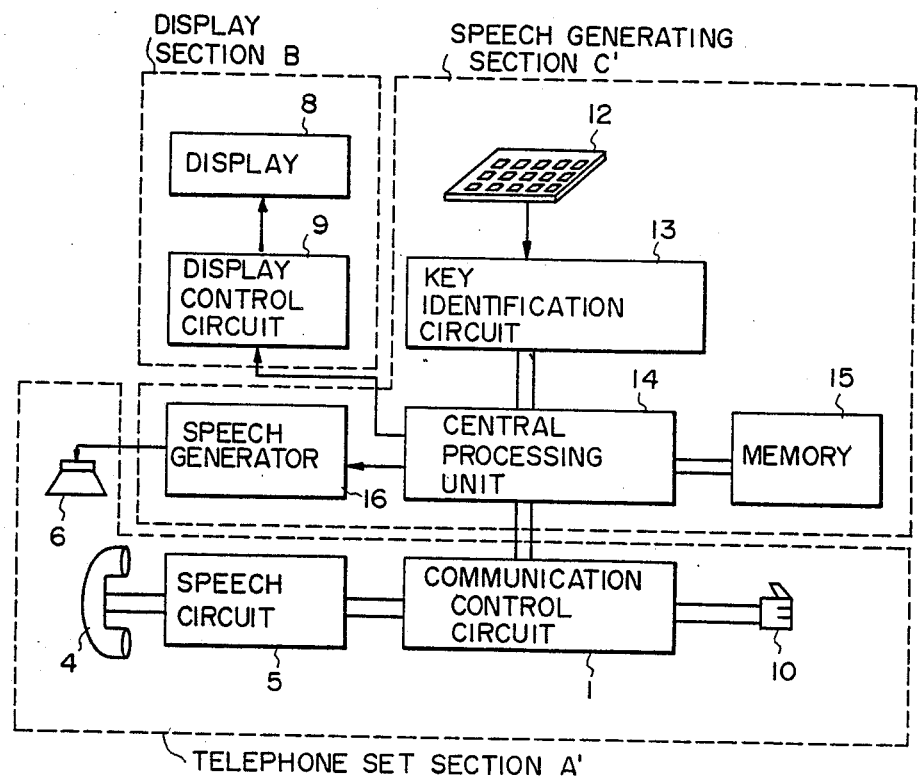
FIG. 2 is a diagram illustrating an arrangement of a terminal for the originating number notifying communication network according to the present invention.

FIG. 2 illustrates the arrangement of a telephone terminal for the originating number notifying communication network in accordance with a first embodiment of the present invention.

In FIG. 2 reference numeral 12 indicates a keyboard which in addition to conventional push-buttons for dialing has keys through which the name of each originating party or a ringing tone identification number of a particular pattern corresponding to the originating party's telephone number is registered in the memory 15 described later; 13 designates a key identification circuit for identifying a key operated on the keyboard 12; 14 designates a central processing unit which analyzes the key information provided from the key identification circuit 13, transfers the contents of a display control circuit 9, and issues a command of input into the memory 15 described later and a command of generation of a particular pattern of speech or tone to the speech generator 16 described later after comparing the originating party's telephone number from the communication control circuit with each of telephone numbers registered in the memory 15; 15 designates a memory for storing of anticipated originating parties subscriber numbers and the corresponding ID information such as the originating subscriber's names, pre-entered from the keyboard 12; and 16 designates a speech generator which responds to the command from the central processing unit 14 to generate a speech on the basis of the ID information registered in the memory 15. The above circuits constitute a speech generating section C which characterize the present invention.

The display section B is identical in construction with that depicted in FIG. 1. The telephone set section A' is substantially identical in construction with that shown in FIG. 1 although it is not shown to include the number input circuit 2, the number identification circuit 3 and the tone-generation circuit 7. These circuits are omitted for their functions partly overlap those of the keyboard 12, the key identification circuit 13 and the speech generator 16 of the speech generating section C.

The speech generator 16 may use the same equipment as one of those which have already been in practical use, or a speech synthesizer on which patent applications (Japan. Pat. Applns. Nos. 119121 to 119123/87, 188831/87 and 190386 to 190387/87) have been filed by the applicant of this application and which has been put on the market in combination with a word processor.

Next, the operation of the present invention will be described.

At first, subscriber numbers of the anticipated originating subscribers and ID information (originating subscriber's names, for example) corresponding thereto are pre-registered in the memory 15 via the key identification circuit 13 and the central processing unit 14 from the keyboard 12. This registration takes place, for instance, in the form of "#-OOO-XXXX TELEPHONE CALL FROM MR. ΔΔΔ OF THE GENERAL AFFAIRS SECTION" by entering from the keyboard 12 a special symbol (#), then the telephone number (OOO-XXXX) desired to be registered, then the organization to which the originating subscriber belongs, followed by the originating subscriber's name. Incidentally, the registration of the originating subscriber's name in characters may be done by entering numeric codes ("036" for "A", for example) as is the case with the ID registration already practised in facsimile terminals or the like.

Further, common characters such as "TELEPHONE CALL FROM MR." may be registered for each case. Alternatively, these common phrases may be stored at some other addresses and read out therefrom by the central processing unit 14 after the readout of the registered ID information corresponding to the subscriber's number when it coincides with the terminating subscriber's number. The above is the operation necessary for initialization.

When the originating subscriber's number from the originating number notifying communication network is presented to the communication control circuit 1 via the modular jack 10, the communication control circuit 1 converts the received originating subscriber's number, formed by a multi-frequency signal, into number information in the form of binary signals "0" and "1", that is provided to the central processing unit 14.

The central processing unit 14 checks the originating subscriber's number as to whether it coincides with any one of the subscriber's numbers registered in the memory 15, and when coincidence is detected, the central processing unit 14 reads out and transfers the corresponding ID information to the speech generator 16 and the display control circuit 9, together with a display (generation) command. On the other hand, when there is no registered subscriber's number coincident with the originating subscriber's one, the central processing unit deals with the incoming call according to a predetermined method in which it transfers only the originating subscriber's number or ID information "TELEPHONE CALL" alone to the speech generator 16 and the display control circuit 9, or merely rings the bell of the telephone set as is conventional. Next, the speech generator 16 converts the contents of the memory 15, which are read out via the central control circuit 14, into the signal indicating the frequency characteristic of the speech and provides it to the speaker 6, thus providing an audible indication of the ID information such as the originating subscriber's name.

The display section B may be arranged to display the same information as that of the speech generator 16 via the central processing unit 14, but it may also be arranged to display some different information by pre-registering in the memory 15 information exclusively for use by the display section B, such as the names of countries and organizations from which incoming calls are anticipated. While this embodiment has been described to include the display section B, it may also be omitted for simplification of the device configuration. If the recording function is added in place of the display section B, even if an originating subscriber hooks on the handset (i.e. even if he terminates the telephone call) before being answered, his name can be stored on the terminating side.

Moreover, the telephone set section A' and the speech generating section C need not always be provided in one equipment, but they may also be provided separately.

The foregoing description has been given of the device configuration which is assumed to employ an analog telephone network as the originating number notifying communication network. Next, the present invention will be described in connection with the case of employing ISDN (Integrated Services Digital Network) which is now being highlighted. (Embodiment 2)

Figure 3:
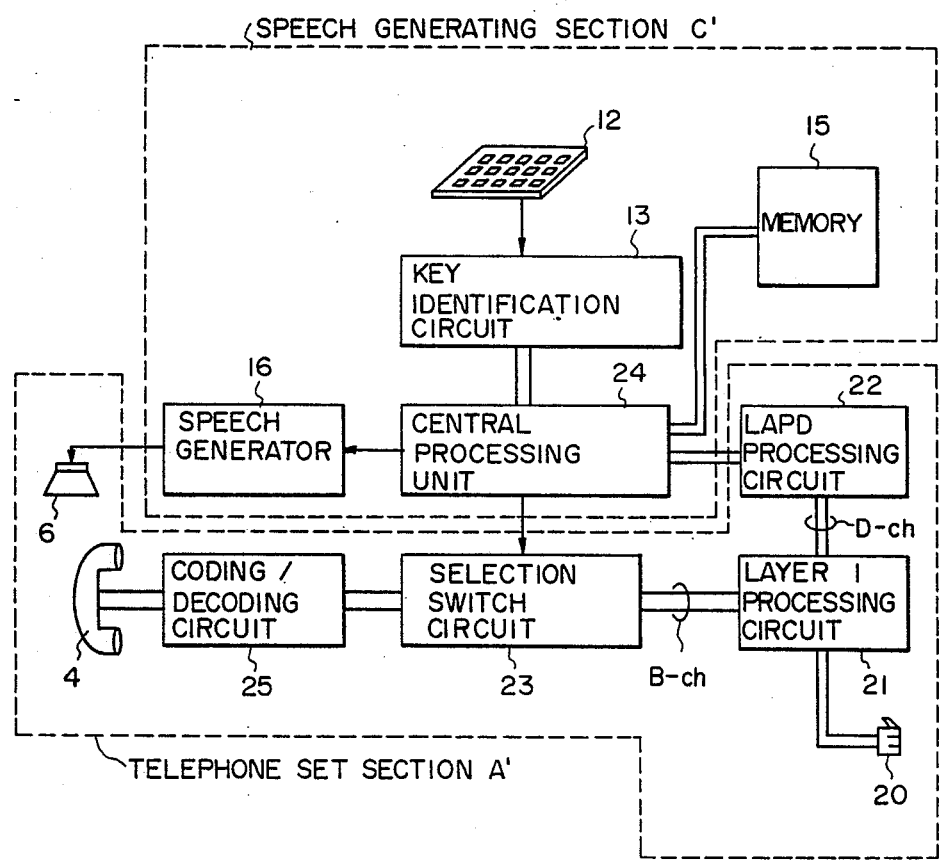
FIG. 3 is a diagram illustrating the ISDN telephone terminal according to the present invention.

FIG. 3 illustrates the arrangement of a telephone terminal for ISDN according to a second embodiment of the present invention. This telephone terminal will be described on the assumption that it has the function of processing the ISDN protocol based on the relevant CCITT (International Telegraph and Telephone Consultative Committee) Recommendations (hereinafter referred to simply as "Recommendations").

This embodiment greatly differs from Embodiment 1 in its telephone set section "A", and the speech generating section C' differs only in a central processing unit 24 which has also protocol processing function of layer 3 (procedures for setting up and releasing a communication) as specified in Recommendation I.451.

In FIG. 3, reference numeral 20 indicates a modular jack for insertion into an ISDN terminal socket provided on a wall or pillar for connection to the ISDN; 21 designates a layer 1 processing circuit whereby the transmission and reception of signals and the multiplexing and demultiplexing signals on two B channels and one D channel are controlled, on the basis of layer 1 (electrical and physical conditions) of an ISDN basic access interface (2B+D, B=64 kbps/D=16 kbps) specified in Recommendation I.430, provided over a bus consisting of cables provided in a subscriber's home so as to transfer communication signals which are transmitted to and from ISDN; 22 designates a circuit which processes layer 2 (a function for error correction and flow control, hereinafter referred to as "LAPD") of an ISDN user-network interface as specified in Recommendation I441 (Q.921) so as to guarantee a high reliability signal transfer on the D channel between the telephone set section A" and the ISDN; 23 designates a selection switch circuit whereby one of the two B channels provided at the ISDN basic access interface is selected on the basis of a command from the central processing unit 24; 25 designates a coding/decoding circuit which performs conversion operations between an electrical analog signal in the handset 4 and a digital signal for transferring voice signals in the ISDN; 4 designates the same handset as that used in Embodiment 1; and 6 designates the same speaker as that used in Embodiment 1. These circuits constitute the telephone set section A".

Next, a description will be given of how originating number notifying service is used in the ISDN telephone terminal according to Embodiment 2. In this instance, the subscriber's number which is transferrd from the ISDN at the time of setting up a call to this terminal is received by the central processing unit 24 in accordance with the procedure as specified in Recommendation I.451 (Q.931). The central processing unit 24 is identical in function with the central processing unit 14 except that the display command to the display control circuit 9 in Embodiment 1 is unnecessary. Accordingly, the central processing unit derives the calling party's name or ringing tone identification number corresponding to the originating subscriber's number in the memory 15 and transfers it to the speech generator 16. The subsequent operations are exactly the same as those in Embodiment 1.

Although this embodiment has been described not to include the display section B, it is also possible to display the name of the country, district or similar information of the originating subscriber by providing the display section B as in Embodiment 1.

Further, the present invention is not limited specifically to the telephone terminal but may also be applied to a facsimile terminal or any other ISDN terminal.

As described above, according to the present invention, subscribers' numbers of the anticipated originating (or calling) parties are pre-registered and when any one of the registered subscribers' number coincides with the originating subscriber's number, the terminating subscriber can immediately know the originating party from the audible indication before answering the call 4; so that not only the terminating subscriber but also a third party responding to the incoming call can deal with the call very easily. Moreover, the present invention can be used to eliminate the necessity of answering unwanted harassing calls or frequent sales calls by identifying registering their telephone numbers when receiving them for the first time. Thus the present invention is of great utility in practical use.

What we claim is:

1. A terminal for use with a communication system for receiving incoming calls of originating parties of the communication system and for notifying individual terminating parties by an audible indication of individual subscribers' incoming calls being received the terminal comprising, means for connecting the terminal to the communication system for receiving incoming calls therefrom, memory means for pre-registering a plurality of subscriber's numbers whose incoming calls are anticipated and ID information corresponding to each individual subscribers number, control means connected to said memory means and receptive of incoming calls for determining whether an incoming call number corresponds with a registered subscriber's number and for generating a command signal output representative of the subscriber's registered number when correspondence of an incoming call number and a subscriber's registered number occurs, and speech generating means for receiving and responding to said control means command signal output for providing an audible indication of the ID information corresponding to the registered subscriber's number corresponding to an incoming call number of an originating party.

2. A terminal for use with a communication system for receiving incoming calls of originating parties of the communication system and for notifying individual terminating parties by an audible indication of individual subscriber's incoming calls being received according to claim 1 in which said control means comprises terminal means for connection to an analog telephone line, and a communication control circuit connected to the analog telephone line for controlling transmission and reception of signals and tones on the analog telephone line.

3. A terminal for use with a communication system for receiving incoming calls of originating parties of the communication system and for notifying individual terminating parties by an audible indication of individual subscribers' calls being received according to claim 1, in which said communication system comprises an ISDN and in which said control means comprises ISDN terminal means connected to the ISDN, a first processing circuit connected to the ISDN terminal means for the transmission and reception of signals and for multiplexing and demultiplexing of signals on the ISDN, a second processing layer defining and ISDN user-network interface comprising a LAPD processing circuit connected to the first processing layer for processing error correction and flow control of signals at the interface, and a central processing unit connected to the LAPD processing circuit for controlling the transmission and reception of signals and tones at the output side of the LAPD processing circuit.

* * * * *